(12) United States Patent
Byron et al.

(10) Patent No.: US 9,606,978 B2
(45) Date of Patent: *Mar. 28, 2017

(54) DISCOVERING RELATIONSHIPS IN TABULAR DATA

(71) Applicant: International Business Machines Corporation, Armonk, NY (US)

(72) Inventors: Donna K. Byron, Boston, MA (US); Scott N. Gerard, Wake Forest, NC (US); Alexander Pikovsky, Laxington, MA (US); Matthew B. Sanchez, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/090,184

(22) Filed: Nov. 26, 2013

(65) Prior Publication Data
US 2015/0007007 A1    Jan. 1, 2015

Related U.S. Application Data

(63) Continuation of application No. 13/932,435, filed on Jul. 1, 2013.

(51) Int. Cl.
*G06F 17/00* (2006.01)
*G06F 17/24* (2006.01)
*G06F 17/27* (2006.01)

(52) U.S. Cl.
CPC .......... *G06F 17/245* (2013.01); *G06F 17/246* (2013.01); *G06F 17/27* (2013.01)

(58) Field of Classification Search
CPC ................. G06F 17/246; G06F 17/245; G06F 17/30654; G06F 17/2785; G06F 17/30684; G06F 17/3053
See application file for complete search history.

(56) References Cited

U.S. PATENT DOCUMENTS 4,688,195 A     8/1987  Thompson et al.
4,958,285 A *   9/1990  Tominaga .................... 704/8
(Continued)

FOREIGN PATENT DOCUMENTS

| JP | 05334490 | 12/1993 |
| JP | 405334490 A | 12/1993 |
| WO | 03012661 A1 | 3/2003 |

OTHER PUBLICATIONS

"About SemanticTable", SemanticTable.org, Bioinformatics and Systems Engineering (BASE) division, RIKEN, http://semantictable.org, accessed on Oct. 25 2012, 1 page.
(Continued)

*Primary Examiner* — Kyle Stork
*Assistant Examiner* — Barbara Level
(74) *Attorney, Agent, or Firm* — Garg Law Firm, PLLC; Rakesh Garg; Reza Sarbakhsh

(57) ABSTRACT

A method for discovering relationships in tabular data is provided in the illustrative embodiments. A set of documents is received, a document in the set including the tabular data. A cell in the tabular data is selected whose dependencies are to be determined. A hypothesis to use in conjunction with the cell is selected. Whether the hypothesis applies to a selected portion of the document is tested by determining whether a conclusion in the hypothesis can be computed using a function specified in the hypothesis on the selected portion. The selected portion can be a selected cell-range in the tabular data or content in a non-tabular portion of the document. The hypothesis is utilized to describe the cell relative to the selected portion.

8 Claims, 7 Drawing Sheets

(56) References Cited

U.S. PATENT DOCUMENTS

| | | | |
|---|---|---|---|
| 5,491,700 | A | 2/1996 | Wright et al. |
| 6,128,297 | A | 10/2000 | Reumerman et al. |
| 6,161,103 | A | 12/2000 | Rauer et al. |
| 6,904,428 | B2 | 6/2005 | Frieder et al. |
| 7,412,510 | B2 | 8/2008 | Schweitzer et al. |
| 7,620,665 | B1 | 11/2009 | George et al. |
| 7,631,065 | B2 | 12/2009 | Schweitzer et al. |
| 7,774,193 | B2 | 8/2010 | Gao |
| 7,792,823 | B2 | 9/2010 | Cain et al. |
| 7,792,829 | B2 | 9/2010 | Brill et al. |
| 8,037,108 | B1 | 10/2011 | Chang |
| 8,055,661 | B2 | 11/2011 | Lee et al. |
| 8,255,789 | B2 | 8/2012 | Berger |
| 8,364,673 | B2 | 1/2013 | Chang et al. |
| 8,442,988 | B2 | 5/2013 | Draese et al. |
| 8,719,014 | B2 | 5/2014 | Wagner |
| 8,781,989 | B2 | 7/2014 | Duchon |
| 8,910,018 | B2 | 12/2014 | Huang et al. |
| 2002/0078406 | A1 | 6/2002 | Kondoh |
| 2002/0111961 | A1* | 8/2002 | Billings ............... G06F 17/211 715/221 |
| 2003/0061030 | A1 | 3/2003 | Kuboyama et al. |
| 2003/0097384 | A1 | 5/2003 | Hu |
| 2004/0030687 | A1 | 2/2004 | Hidaka |
| 2004/0103367 | A1 | 5/2004 | Riss et al. |
| 2004/0117739 | A1 | 6/2004 | Challenger et al. |
| 2004/0194009 | A1* | 9/2004 | LaComb et al. .............. 715/500 |
| 2005/0027507 | A1* | 2/2005 | Patrudu ............................ 704/1 |
| 2006/0085667 | A1* | 4/2006 | Kubota ............... G06F 17/3089 714/4.1 |
| 2006/0173834 | A1 | 8/2006 | Brill et al. |
| 2006/0288268 | A1* | 12/2006 | Srinivasan ............ G06F 17/245 715/210 |
| 2007/0011183 | A1* | 1/2007 | Langseth .......... G06F 17/30616 |
| 2008/0027888 | A1 | 1/2008 | Azzam |
| 2008/0208882 | A1 | 8/2008 | Zhang et al. |
| 2009/0063470 | A1* | 3/2009 | Peled et al. ........................ 707/5 |
| 2009/0171999 | A1 | 7/2009 | McColl et al. |
| 2009/0287678 | A1* | 11/2009 | Brown et al. ..................... 707/5 |
| 2009/0313205 | A1 | 12/2009 | Hino |
| 2010/0050074 | A1 | 2/2010 | Nachmani et al. |
| 2010/0146450 | A1 | 6/2010 | Harada |
| 2010/0169758 | A1* | 7/2010 | Thomsen ...................... 715/212 |
| 2010/0280989 | A1 | 11/2010 | Mehra |
| 2010/0281455 | A1 | 11/2010 | Anand et al. |
| 2011/0022550 | A1 | 1/2011 | Pennacchiotti |
| 2011/0055172 | A1 | 3/2011 | Tan |
| 2011/0060584 | A1 | 3/2011 | Ferrucci et al. |
| 2011/0066587 | A1 | 3/2011 | Ferrucci et al. |
| 2011/0125734 | A1* | 5/2011 | Duboue et al. ................ 707/723 |
| 2011/0126275 | A1 | 5/2011 | Anderson et al. |
| 2011/0301941 | A1* | 12/2011 | De Vocht ........................ 704/9 |
| 2011/0320419 | A1 | 12/2011 | Johnston et al. |
| 2012/0004905 | A1 | 1/2012 | Bobick et al. |
| 2012/0011115 | A1 | 1/2012 | Madhavan et al. |
| 2012/0078888 | A1* | 3/2012 | Brown et al. .................. 707/723 |
| 2012/0078891 | A1* | 3/2012 | Brown et al. .................. 707/723 |
| 2012/0143793 | A1* | 6/2012 | Bowers et al. .................. 706/12 |
| 2012/0191716 | A1 | 7/2012 | Omoigui |
| 2012/0251985 | A1 | 10/2012 | Steels |
| 2012/0303645 | A1* | 11/2012 | Kulkarni-Puranik ......... 707/756 |
| 2012/0303661 | A1 | 11/2012 | Blohm et al. |
| 2013/0007055 | A1 | 1/2013 | Brown et al. |
| 2013/0018652 | A1 | 1/2013 | Ferrucci et al. |
| 2013/0031082 | A1* | 1/2013 | Wolfram et al. .............. 707/706 |
| 2013/0060774 | A1* | 3/2013 | Shepherd et al. ............. 707/737 |
| 2013/0066886 | A1 | 3/2013 | Bagchi et al. |
| 2013/0117268 | A1* | 5/2013 | Smith ................. G06F 17/2264 707/739 |
| 2013/0124957 | A1* | 5/2013 | Oppenheimer et al. ...... 715/212 |
| 2013/0290822 | A1* | 10/2013 | Chen ............................ 715/212 |
| 2013/0325442 | A1 | 12/2013 | Dahlmeier et al. |
| 2014/0046696 | A1 | 2/2014 | Higgins |
| 2014/0115012 | A1 | 4/2014 | Das |
| 2014/0122535 | A1 | 5/2014 | Gerard et al. |
| 2014/0214399 | A1* | 7/2014 | Gulwani et al. ................. 704/8 |
| 2014/0278358 | A1 | 9/2014 | Byron et al. |
| 2015/0066895 | A1 | 3/2015 | Komissarchik et al. |

OTHER PUBLICATIONS

"Gleaning Resource Descriptions from Dialects of Languages (GRDDL), WC3 , Recommendation", W3C, http://www.w3.orgfTR/grddll, Sep. 11, 2007,17 pages.

"SPARQLMolion Gettin9 Started GUide", TopQuadrant, Inc., http://www.topquadrant.com/products/SPARQLMotion_docs/ SPARQLMotion--9uide.html, accessed on Oct. 25, 2012,6 pages.

Golbeck, Jennifer et ai, "New Tools for the Semantic Web", Knowledge Engineering and Knowledge Management. Ontologies and the Semantic Web, Lecture Notes in Computer Science, DOI: 10.1007/3-540-45810-7_35, vol. 2473/2002, 2002, 11 pages.

Langegger, Andreas et al., XLWrap—Querying and Integrating Arbitrary Spreadsheets with SPARQL, Proceedings of the 8th International Semantic Web Conference, 2009, Springer-Verlag Berlin, Heidelberg, ISBN: 978-3-642-04929-3,2009, pp. 359-374.

High, Rob, "The Era of Cognitive Systems: An Inside Look at IBM Watson and How it Works", IBM Corporation, http://ip.com/pdf/ redbook/REDP495500.pdf, 2012, 16 pages.

Yuan, Michael J., "Watson and healthcare", IBM developerWorks, IBM Corporation, Apr. 12, 2011, 14 pages.

Pinto et al., Table Extraction Using Conditional Random Fields, http://scholarworks.umass.edu/cs_faculty_pubs, 2003,Computer Science Department Faculty Publication Series, Paper 76.

Piris, Ruben Navarro, Extracting Knowledge Bases from table-structured Web Resources applied to the semantic based Requirements Engineering Methodology SoftWiki, 992-995.

Pivk et al., From tables to frame, http://people.aifb.kit.edu/pci/ FromTablesToFramesTech.pdf, Jul. 19, 2004, 1-17.

Tao et al., Automatic hidden-web table interpretation, conceptualization, and semantic annotation, Department of Computer Science, Brigham Young University, Provo, UT 84602, USA, 1-21.

Syed et al. : http://journal.webscience.org/322/2/websci10_submission_108.pdf.

U.S. Appl. No. 14/492,172.

"Gleaning Resource Descriptions from Dialects of Languages (GRDDL), WC3 Recommendation", W3C, http://www.w3.orgfTR/ grddll, Sep. 11, 2007, 17 pages.

"SPARQLMotion Getting Started Guide", TopQuadrant, Inc., http:// www.topquadrant.com/products/SPARQLMotion_docs/ SPARQLMotion--9guide.html, accessed on Oct. 25, 2012, 6 pages.

Golbeck, Jennifer et al., "New Tools for the Semantic Web", KnOWledge Engineering and Knowledge Management: Ontologies and the Semantic Web, Lecture Notes in Computer Science, 001:10. 1007/3-540-45810-7_35, vol. 2473/2002, 2002, 11 pages.

IBM, "Dynamic Model-Extracting Table Widget", ip.com, IPCOMOOO010243D, Nov. 11, 2002,7 pages.

Langegger, Andreas et al., "XLWrap—Querying and Integrating Arbitrary Spreadsheets with SPARQL", Proceedings of the 8th International Semantic Web Conference, 2009, Springer-Verlag Berlin, Heidelberg, ISBN: 978-3-642-04929-3, 2009, pp. 359-374.

Byron et al; ,Discovering Relationships in Tabular Data, filed Jul. 1, 2013, U.S. Appl. No. 13/932,435.

Byron, et al., "Subject-Matter Analysis of Tabular Data", filed Jul. 18, 2013, U.S. Appl. No. 13/945,259.

Pinto, David, "Table Extraction Using Conditional Random Fields", http://schoiarworks.urnass.edu/csJaculty pubs/76, 2003, Computer Science Department Faculty Publication Series, Paper 76, 9 pages.

Piris, Ruben N., "Extracting Knowledge Bases from Table-Structured Web",Resources Applied to the Semantic Based Requirements Engineering Methodology SoftWiki, http://subs.emis.de/LNI/Proceedings/Proceedings176/1008.pdf, 2010, pp. 992-995.

Pivk, Aleksander et al., "From Tables to Frames", http://peopie. aifb.kitedu/pcilFromTablesToFramesTech.pdf, Jul. 19, 2004, 1-17.

Tao, Cui et al., "Automatic Hidden-Web Table Interpretation, Conceptualization, and Semantic Annotation", Department of Computer Science, Brigham Young University, Povo, UT 84602, USA, 2009, pp. 1-21.

(56) References Cited

OTHER PUBLICATIONS

Yuan, Michael J., "Watson and healthcare, How natural language processing and semantic search could revolutionize clinical decision support", IBM developerWorks, IBM Corporation, Apr. 12, 2011, 14 pages.
IBM; Dynamic Model-Extracting Table Widget, IP.com, Nov. 11, 2002.
"About Semantic Table", SemanticTable.org, Bioinformatics and Systems Engineering (BASE) division, RIKEN, http://semantictable.org, accessed on Oct. 25, 2012, 1 page.
"Gleaning Resource Descriptions from Dialects of Languages (GRDDL), WC3, Recommendation", W3C, http://www.w3.orgfTR/grddll, Sep. 11, 2007,17 pages.
"SPARQL Molion Getting Started GUide", TopQuadrant, Inc., http://www.topquadrant.com/products/SPARQLMotion_docs/SPARQLMotion--gui de.html, accessed on Oct. 25, 2012,6 pages.
Golbeck, Jennifer et ai, "New Tools for the Semantic Web", Knowledge Engineering and Knowledge Management. Ontologies and the Semantic Web,Lecture Notes in Computer Science, DOI: 10.1007/3-540-45810-7_35, vol. 2473/2002, 2002, 11 pages.
Langegger, Andreas et al., "XLWrap—Querying and Integrating Arbitrary Spreadsheets with SPARQL", Proceedings of the 8th International Semantic Web Conference, 2009, Springer-Verlag Berlin, Heidelberg, ISBN: 978-3-642-04929-3,2009, pp. 359-374.
U.S. Appl. No. 13/925,015, Notice of allowance—060415.
U.S. Appl. No. 13/664,144.
U.S. Appl. No. 13/925,015.
U.S. Appl. No. 14/082,862.
About Semantic Table, Semantic Table.org, Bioinformatics and Systems Engineering (BASE) division, RIKEN, http://semantictable.org, accessed on Oct. 25, 2012.
"Gleaning Resource Descriptions from Dialects of Languages (GRDDL)", W3C Recommendation, W3C, http:/Vv\lviN.w3org/TR/grddl, Sep. 11, 2007, 17 pages.

"SPARQLMotion Getting Started Guide", TopQuadrant, Inc., http://www.topquadrant.com/products/SPARQLMotion,_docs/SPARQUVlotion_guide.ht ml, accessed on Oct. 25, 2012,6 pages.
Golbeck, Jennifer et al., "New Tools fm the Semantic Web", Knowledge Engineering and Knowledge Management: Ontologies and the Semantic Web, Lecture Notes in Computer Science, 001'10.1007/3-540-45810-7_35, vol. 2473/2002, 11 pages.
High, Rob, "The Era of COGnitive Svstems: An Inside Look at IBM Watson and How it Works", IBM Corporation, htrD:/lip.co~/pdf/redbook/REDP495500.pdf, Dec. 12, 2012, 16 pages.
IBM, "Dynamic Model-Extracting Table Widget", IP.com, IPCOMOOO010243D, Nov. 11, 2002, 7 Pages.
Langegger, Andreas et al., "XLWrap—Querying and Integrating Arbitrary Spreadsheets with SPARQL", Proceedings of the 8th International Semantic Web Conference, 2009, Springer-Verlag Berlin, Heidelberg, ISBN: 978-3-642-04929-3, 2009, 16 pages.
Pinto, David, "Table Extraction Using Conditional Random Fields", http://scholarv'Jorks.umass.edu/cs, Jaculty_pubs/76, 2003, Computer Science, Department Faculty Publication Series, Paper 76, 9 Pages.
Piris, Ruben N., "Extracting Knowledge Bases from Table-Structured Web Resources Applied to the Semantic Based Requirements Engineering Methodology SoftWiki", http://subs.emis.de/LNIIProceedings/Proceedings176/1 008.pdf, 2010, pp. 992-995.
Pivk, Aleksander et al., "From Tables to Frames", http://people.aifb.kit.edu/pci/FrornTablesToFramesTech. pdf, Jul. 19, 2004, 1-17.
Tao, Cui et ai., "Automatic Hidden-Web Table Interpretation, Conceptualization, and Semantic Annotation", Department of Computer Science, Brigham Young University, Provo, UT 84602, USA, 2009, pp. 1-21.
Yuan, Michael J., "Watson and healthcare, How natural language processing and CF semantic search could revolutionize clinical decision support", IBM developerWorks, IBM Corporation, Apr. 12, 2011, 14 pages.
Appendix P, 2016.

* cited by examiner

302 FISCAL YEAR ENDED JANUARY 31, 304 (DOLLARS IN THOUSANDS)

352 CHANGE 354

| 312 | 2009 306 | 2008 308 | 2007 310 | 2009 vs. 2008 356 | | 2008 vs. 2007 358 | |
|---|---|---|---|---|---|---|---|
| REVENUES AND NONOPERATING INCOME | | | | | | | |
| 316 ELECTRIC | $1,899,457 | $1,605,238 | $1,515,746 | $294,219 | 18.3% | $89,492 | 5.9% |
| 318 GAS | 251,884 | 255,439 | 254,340 | (3,555) | -1.4% | 1,099 | 0.4% |
| 314 TOTAL OPERATING REVENUES | 2,151,341 | 1,860,677 | 1,770,086 | 290,644 | 15.6% | 90,591 | 5.1% |
| 322 NONOPERATING INCOME, NET | 72,008 | 116,956 | 95,987 | (44,948) | -38.4% | 20,969 | 21.8% |
| 320 TOTAL REVENUES AND NONOPERATING INCOME | 2,223,349 | 1,977,633 | 1,866,073 | 245,716 | 12.4% | 111,560 | 6.0% |
| EXPENSES | | | | | | | |
| OPERATING EXPENSES | | | | | | | |
| FUEL, PURCHASED POWER AND DISTRIBUTION GAS | 899,314 | 701,190 | 659,839 | 198,124 | 28.3% | 41,351 | 6.3% |
| STP OPERATION AND MAINTENANCE | 139,073 | 121,754 | 115,269 | 17,319 | 14.2% | 6,485 | 5.6% |
| CPS ENERGY OPERATION AND MAINTENANCE | 323,874 | 311,437 | 277,619 | 12,437 | 4.0% | 33,818 | 12.2% |
| ANNUAL OPEB COST | 13,054 | 13,377 | 16,145 | (323) | -2.4% | (2,868) | -17.1% |
| REGULATORY ASSESSMENTS | 31,257 | 23,192 | 28,645 | 8,065 | 34.8% | (5,453) | -19.0% |
| DECOMMISSIONING | 21,201 | 25,608 | 25,387 | (4,407) | -17.2% | 221 | 0.9% |
| DEPRECIATION, DEPLETION AND AMORTIZATION | 283,398 | 264,657 | 262,375 | 18,741 | 7.1% | 2,282 | 0.9% |
| TOTAL OPERATING EXPENSES | 1,711,171 | 1,461,215 | 1,385,279 | 249,956 | 17.1% | 75,936 | 5.5% |

DISCOVERING RELATIONSHIPS IN TABULAR DATA

The present application is a continuation application of, and claims priority to, a U.S. patent application of the same title, Ser. No. 13/932,435, which was filed on Jul. 1, 2013, assigned to the same assignee, and incorporated herein by reference in its entirety.

BACKGROUND

1. Technical Field

The present invention relates generally to a method for natural language processing of documents. More particularly, the present invention relates to a method for discovering relationships in tabular data.

2. Description of the Related Art

Documents include information in many forms. For example, textual information arranged as sentences and paragraphs conveys information in a narrative form.

Some types of information are presented in a tabular organization. For example, a document can include tables for presenting financial information, organizational information, and generally, any data items that are related to one another through some relationship.

Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

SUMMARY

The illustrative embodiments provide a method for discovering relationships in tabular data. An embodiment receives a set of documents, a document in the set including the tabular data. The embodiment selects a cell in the tabular data whose dependencies are to be determined. The embodiment selects a hypothesis to use in conjunction with the cell. The embodiment tests, using a processor and a memory, whether the hypothesis applies to a selected portion of the document by determining whether a conclusion in the hypothesis can be computed using a function specified in the hypothesis on the selected portion, wherein the selected portion of the document comprises one of a selected cell-range in the tabular data and content in a non-tabular portion of the document. The embodiment utilizes the hypothesis to describe the cell relative to the selected portion.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts an example of tabular data within which functional dependencies can be identified in accordance with an illustrative embodiment;

DETAILED DESCRIPTION

Figure 1:
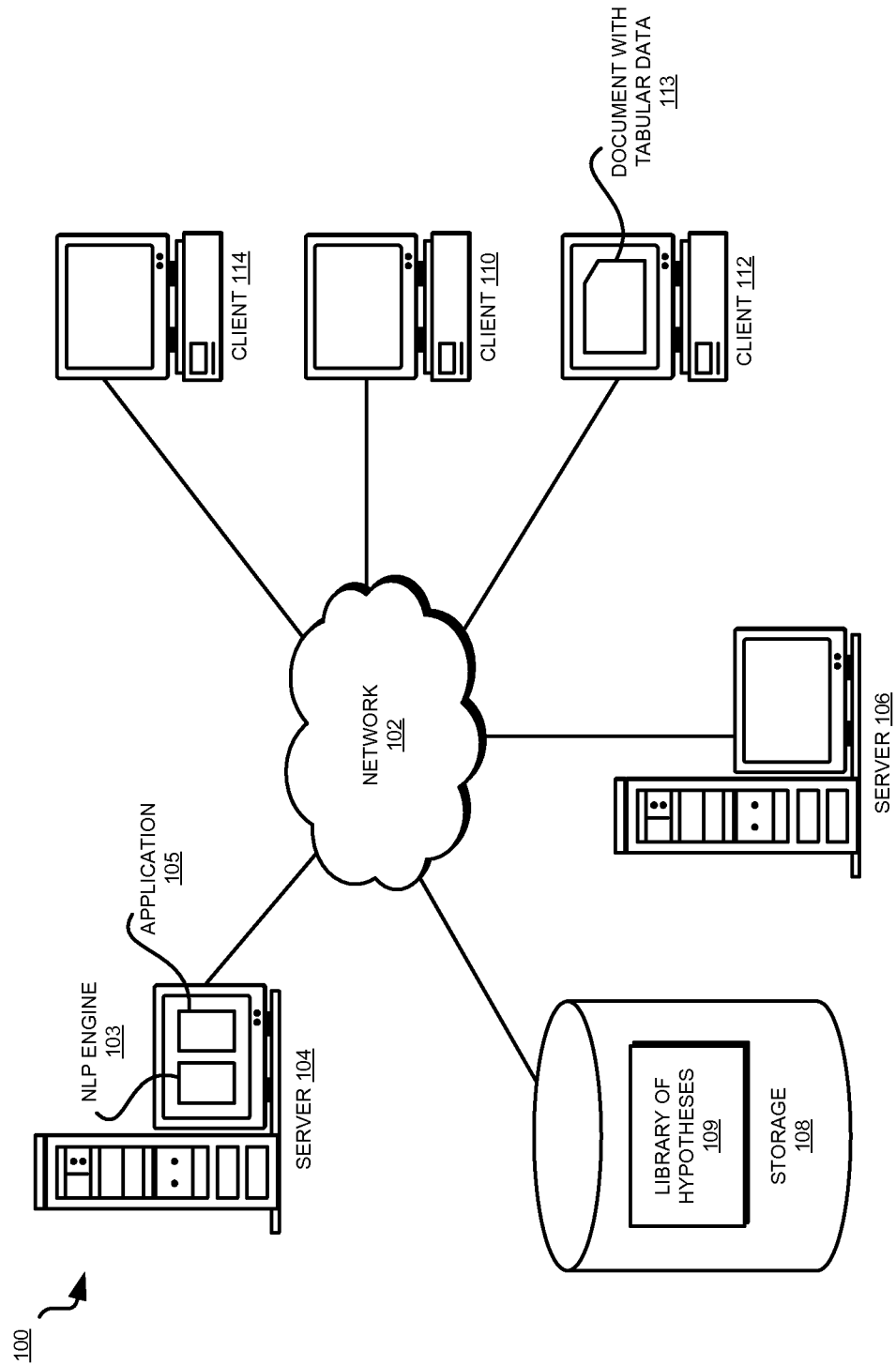
FIG. 1 depicts a pictorial representation of a network of data processing systems in which illustrative embodiments may be implemented.

The illustrative embodiments recognize that documents subjected to NLP commonly include tabular data, to with, content in the form of one or more tabular data structures (tables). A cell of a table is a containing unit within a table, such that the contents of the cell can be uniquely identified by a row and column or other suitable coordinates of the table.

The illustrative embodiments recognize that information presented within the cells of a table often relates to information in other cells of the same table, cells of a different table in the same document, or cells or a different table in a different document. The relationships between the information contained in different cells is important for understanding the meaning of the tabular data, and generally for understanding the meaning of the document as a whole.

The illustrative embodiments recognize that specialized processing or handling is needed in NLP for interpreting the tabular data correctly and completely. Presently available technology for understanding the relationship between cell-values is limited to heuristically guessing a label for a cell using the row or column titles.

The illustrative embodiments used to describe the invention generally address and solve the above-described problems and other problems related to the limitations of presently available NLP technology. The illustrative embodiments provide a method for discovering relationships in tabular data.

The illustrative embodiments recognize that a cell in a table can depend on other one or more cells in the table, cells across different tables in the given document, or cells across different tables in different documents. The dependency of one cell on another is functional in nature, to with, dependent based on a function. The functions forming the bases of such functional dependencies can be, for example, any combination of mathematical, statistical, logical, or conditional functions that operate on certain cell-values to impart cell-values in certain other cells.

As an example, a cell containing a total amount is functionally dependent upon the cells whose values participate in the total amount. As another example, a statistical analysis result cell, such as a cell containing a variance value in an experiment, can be functionally dependent on a set of other cells, perhaps in another table, where the outcomes of the various iterations of the experiment are recorded.

These examples are not intended to be limiting on the illustrative embodiments. Functional dependencies are indicative of relationships between the cells of one or more tables, and are highly configurable depending on the data in a table or document, purpose there for, and the meaning of the various cells.

Furthermore, a cell can participate in any number of functional dependencies, both as a dependant cell and/or as a depended-on cell. Because information in a cell can relate to information available anywhere in a given document, a functional dependency of a cell can include depending on non-tabular data in a given document as well.

The illustrative embodiments improve the understanding of the information presented in tabular form in a document by enabling an NLP tool to understand relationships of cells of tabular data. The illustrative embodiments provide a way of determining the functional dependencies of cells in a table on other cells, surrounding text of the table, contents in a document, or a combination thereof.

Precision is a measure of how much of what is understood from a table is correct, over how much is understood from the table. Recall is a measure of how much is understood from the table, over how much information there actually is to understand in the table.

Typically, attempts to improve precision result in degraded recall performance, and vice versa. An embodiment improves both precision and recall in natural language processing of a document with tabular data.

The illustrative embodiments are described with respect to certain documents and tabular data only as examples. Such documents, tabular data, or their example attributes are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
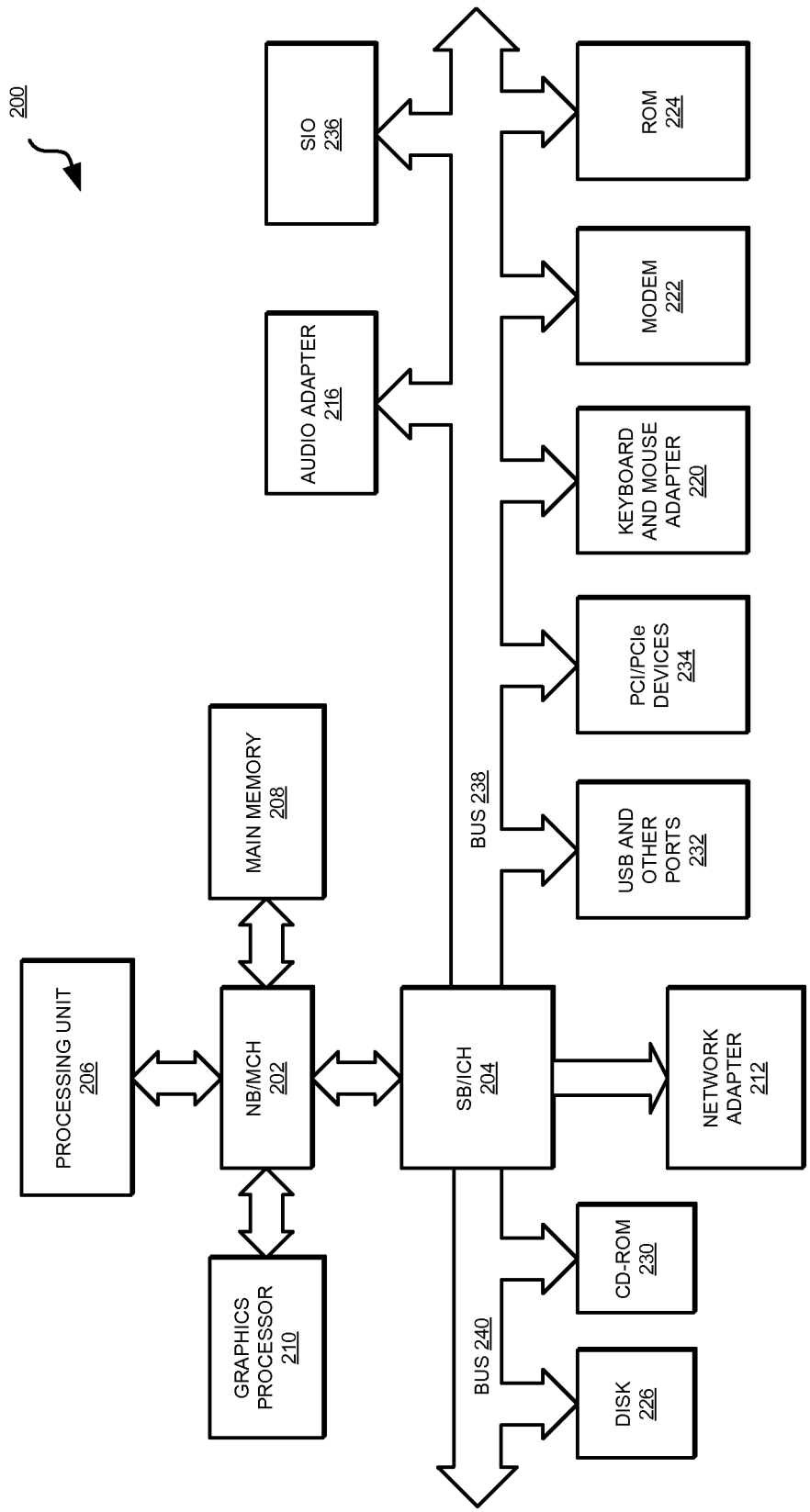
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates in conjunction with NLP engine 103. NLP engine 103 may be, for example, an existing application capable of performing natural language processing on documents, and may be modified or configured to operate in conjunction with application 105 to perform an operation according to an embodiment described herein. Storage 108 includes library of hypotheses 109 according to an embodiment. Client 112 includes document with tabular data 113 that is processed according to an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system.

Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts an example of tabular data within which functional dependencies can be identified in accordance with an illustrative embodiment. Table 300 is an example of tabular data appearing in document 113 in FIG. 1 within which functional dependencies can be determined using application 105 in FIG. 1.

The horizontal or vertical rule-lines are depicted for bounding a table and cell only as an example without implying a limitation there to. A table or tabular data can be expressed in any suitable manner, and a cell can be demarcated in any manner within the scope of the illustrative embodiments. For example, indentation, spacing between cell data, different spacing in tabular and non-tabular content, symbols, graphics, a specific view or perspective to illustrate tabular data, or a combination of these and other example manner of expressing tabular data and cells therein are contemplated within the scope of the illustrative embodiments.

Table 302 is a portion of table 300 and includes several headers that serve to organize the data in the various cells into headings, categories, or classifications (categories). The headers can be row-headers or column headers. The headers are not limited to the table boundaries or extremities within the scope of the illustrative embodiments. For example, a header can be embedded within a table, between cells, such as in the form of a sub-header, for example, to identify a sub-category of tabular data. Such sub-row or sub-column headers are contemplated within the scope of the illustrative embodiments. In one embodiment, certain header information can be specified separately from the corresponding tabular data, such as in a footnote, appendix, another table, or another location in a given document.

For example, header 304 identifies a group of columns, which include data for the broad category of "fiscal year ended January 31." Headers 306, 308, and 310 identify sub-categories of the "fiscal year ended January 31" data, to with, by year, for three example years.

Row headers 312 include some clues. For example, row header 314 is a "total" and is indented under row headers 316 and 318. Similarly, row header 320 is another "total" and is indented under row header 322. The indentations at row headers 314 and 320 are example clues that are useful in understanding the functional relationships between cells in the same row as row headers 314 and 320, and other cells in table 302. The word "total" in row headers 314 and 320 are another example of the clues usable for determining functional dependencies of cells in their corresponding rows in a similar manner.

These example clues are not intended to be limiting on the illustrative embodiments. Many other clues will be conceivable from this disclosure by those of ordinary skill in the art, and the same are contemplated within the scope of the illustrative embodiments.

The same clues help understand the information in different cells differently. For example, consider table 352, which is another portion of table 300. Header 354 identifies a group of columns, which include data for the broad category of "Change." Headers 356 and 358 identify sub-categories of the "change" data, to with, by comparing two consecutive years, from the three example years of categories 306, 308, and 310.

Row headers 312 impart different meanings to the cells in their corresponding rows in tables 302 and 352. For example, while the "total" according to row header 314 implies a dollar amount of income in the corresponding cells in table 302, the same row header implies a dollar amount change and a percentage change in the corresponding cells in table 352. As in this example table 300, in an embodiment, the clues in one location, such as in row headers 312, can also operate in conjunction with other clues, data, or content in other places, to enable determining the meaning of certain cells in a given tabular data.

Figure 4:
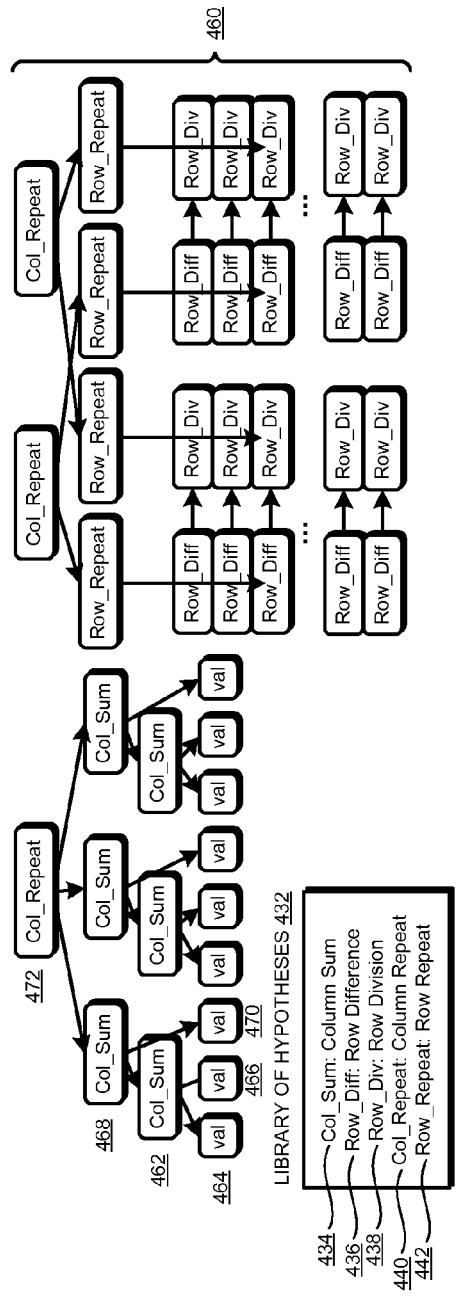
FIG. 4 depicts a block diagram of a manner of discovering relationships in tabular data in accordance with an illustrative embodiment.

With reference to FIG. 4, this figure depicts a block diagram of a manner of discovering relationships in tabular data in accordance with an illustrative embodiment. Table 400 is the same as table 300 in FIG. 3. Tables 402, 452 are analogous to tables 302 and 352 respectively in FIG. 3. Column headers 404, 406, 408, and 410 are analogous to headers 304, 306, 308, and 310 respectively in FIG. 3. Row headers 412-422 are analogous to row headers 312-322 respectively in FIG. 3.

As noted with respect to FIG. 3, clues in an around a given tabular data can assist in determining the functional dependencies of a cell. Similarly, markups in a given table can also form additional clues and assist in that determination, reinforce a previous determination, or both. For example, lines 424 and 426 are example table markups that act as additional clues in determining functional dependencies of some cells. As noted above, lines or other notations for expressing a table or cell demarcation are only examples, and not intended to be limiting on the illustrative embodiments. Tables and cells can be expressed without the use of express aids, such as lines 424 and 426, within the scope of the illustrative embodiments.

As an example, row header 414 indicates that cell 428 contains a total or summation of some values presented elsewhere, perhaps in table 402. In other words, a clue in header 414 helps determine a functional dependency of type "sum" of cell 428 on some other cells.

Line 424 reinforces this determination, and helps narrow a range of cells that might be participating in this functional dependency. For example, an embodiment concludes that contents of cell 428 are a total, or sum, of the cell values appearing above line 424 up to another delimiter, such as another line, table boundary, and the like.

As another example, row header 420 indicates that cell 430 contains a total or summation of some values presented elsewhere, perhaps in table 402. In other words, a clue in header 420 helps either determine or confirm a hypothesis of a functional dependency of type "sum" of cell 430 on some other cells.

Line 426 reinforces this determination, and helps narrow a range of cells that might be participating in this functional dependency. For example, an embodiment concludes that contents of cell 430 are a total, or sum, of the cell values appearing above line 426 up to another delimiter, such as another line, e.g., line 424.

Lines 424 are described as example structural markups or clues only for clarity of the description and not as a limitation on the illustrative embodiments. Another example markup that can similarly assist in determining functional relationships between cells is a semantic clue, such as compatible row and column type. For example, when a row header of a cell indicates a revenue value and the column header of a cell indicates a year, it is likely that the cell in that row and column at least includes a revenue value in that year, and perhaps is related to certain other values in the same column by a sub-total type functional relationship. In this example, a clue relates to a specific cell. Such a cell-specific clue is useful in confirming a functional dependency for that cell, and may or may not be usable for confirming similar functional dependency across the whole column.

As another example, the presence of a common header 404 hints at a commonality in columns 406, 408, and 410. Separately, an embodiment can conclude that the content of headers 406, 408 and 410 all have semantic type "Year." The embodiment determines a hint that these three columns are similar. When the embodiment finds that the same functional dependencies hold in those three columns, the embodiment assesses a confidence level in that finding using the fact that this hint or clue supports the confidence level. A hint as described above is a column-wide hint. A hypothesis that a dependency holds over a number of columns is a column-wide hypothesis. A column-wide hint is useful in supporting a column-wide hypothesis.

An embodiment uses some of the available markups or clues in and around the table to hypothesize a functional dependency. An embodiment further uses other available clues or markups to confirm the hypothesis, thereby improving a confidence level in the hypothesis. Essentially, a hypothesis is a framework of a functional dependency—a hypothetical relationship between hypothetical cells—which when applied to an actual table and constituent cells can be true or false for all cases where applied, or sometimes true and sometimes false.

A hypothesis is confirmed or supported, or in other words, confidence in a hypothesis is above a threshold, if clues or markups support an instance where the functional dependency according to the hypothesis yields a correct result. Confidence in a hypothesis is also increased from one value to another, such as from below a threshold level of confidence to above the threshold level of confidence, if the functional dependency according to the clue can be replicated at other cells or cell-ranges in the given tabular data (i.e., a clue holds true, or supports the hypothesis).

In machine learning terms each clue in a set of all possible supporting clues is called a "feature." Presence or absence of a feature for an existing hypothesis increase or decrease the confidence level in that hypothesis. A "model" according to an embodiment is a mechanism to compute the confidence score for a hypothesis based on a subset of features that are present (or support) the hypothesis. In one embodiment, the model operates as a rule-based engine. IN another embodiment, the model is 'trainable' by using a training set of tables for which confidence score is known a priori (i.e., a "labeled set").

Library of hypotheses 432 is analogous to library of hypotheses 109 in FIG. 1. Library of hypotheses 432 is a collection of hypotheses that an embodiment, such as in application 105 in FIG. 1, receives for determining functional dependencies in table 400. In one embodiment, a user supplies library of hypotheses 432. In another embodiment, an application provides library of hypotheses 432. In one embodiment, library of hypotheses 432 is a part of a larger library of hypotheses (not shown), and is selected according to some criteria. An example criterion for selecting the member hypotheses of library of hypotheses 432 can be domain-specificity. For example, library of hypotheses 432 may include only those hypotheses that are applicable to the domain of the tabular data being analyzed. Constituent hypotheses in library of hypotheses 432 can be changed as the tabular data changes.

In example library of hypotheses 432 as depicted, hypothesis 434 hypothesizes that some cells are a sum of some other cells in the same column, i.e., are "column sums," or "col_sum." Similarly, hypothesis 436 hypothesizes that some cells are a difference between certain other cells in the same row, i.e., are "row difference," or "row_diff." Hypothesis 438 hypothesizes that some cells are a division of certain other cell in the same row with another cell in the same row or a constant, i.e., are "row division," or "row_div."

Hypothesis 440 hypothesizes that some hypotheses repeat in different columns, i.e., are "column repeat," or "col_repeat." For example, "column sum" hypothesis 434 can repeat in column 406, and in columns 408 and 410. Similarly, hypothesis 442 hypothesizes that some hypotheses repeat in different rows, i.e., are "row repeat," or "row_repeat." For example, "row difference" hypothesis 436 can repeat in row 416, and in rows 418 and 414. Applicability of one hypothesis can boost the confidence in applicability of another hypothesis in this manner. In other words, if hypothesis 434 seems to indicate functional dependency between certain cells, and hypothesis 440 seems to validate the applicability of hypothesis 434 across more than one columns, an embodiment exhibits higher than a threshold level of confidence in the functional dependency indicated by hypothesis 434.

Graph 460 shows the various example hypotheses in library of hypotheses 432 in operation on table 400. For example, at element 462 in graph 460, hypothesis col_sum appears to apply to a set of values bound between lines 424 and the beginning of data in table 402, i.e., elements 464 and 46 in graph 460, and results in the value in cell 428. Similarly, at element 468, hypothesis col_sum also appears to apply to the cells between lines 424 and 426, one of which is a result of a previous application of the same hypothesis at element 462, and the other is element 470, and results in the value in cell 430. Element 472 in graph 460 indicates that the arrangement of elements 462, 464, 466, 468, and 470 repeats according to hypothesis 440 in columns 408 and 410 in table 402. Remainder of graph 460 similarly determines the functional dependencies in table 452.

Thus, in the example depicted in FIG. 4, the examples of determined dependencies indicate repeatable patterns and are validated by the supporting computation on the cells involved. Given a suitable threshold level, an embodiment can express a confidence level that exceeds the threshold level. Accordingly, the embodiment outputs a natural language processed form of the cells of table 400 whereby the cell values are expressed not only reference to their denominations or headers, but also by their inter-relationships.

For example, the value in cell 428 would be expressed not only as "two million, one hundred fifty one thousand, three hundred and forty one dollars of total revenues and non-operating income in 2009" but also as "a total of the income in electric and gas categories of the revenues and non-operating income in the year 2009." Such natural language processing with the benefit of an embodiment is far more useful and informative than what can be produced from the presently available NLP technology.

Figure 5:
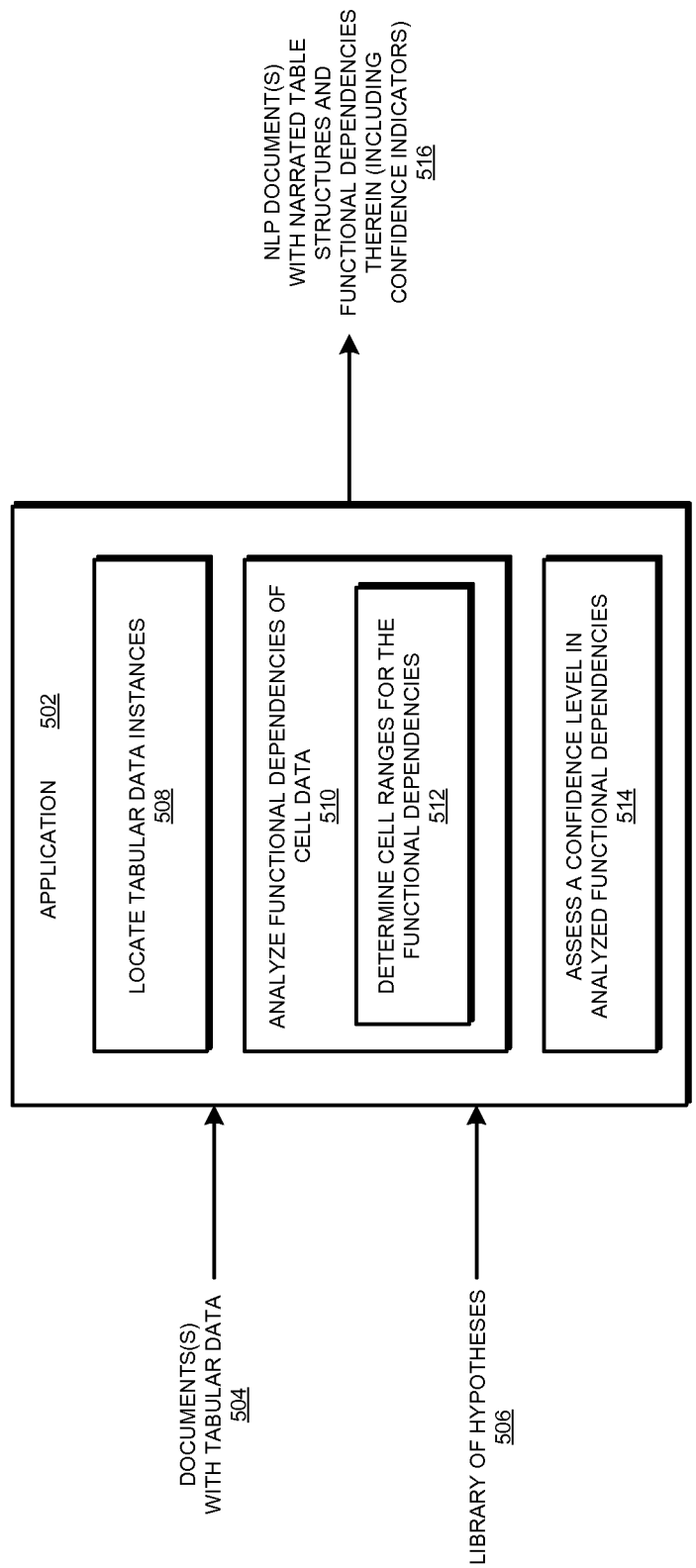
FIG. 5 depicts a block diagram of an application for discovering relationships in tabular data in accordance with an illustrative embodiment.

With reference to FIG. 5, this figure depicts a block diagram of an application for discovering relationships in tabular data in accordance with an illustrative embodiment. Application 502 can be used in place of application 105 in FIG. 1.

Application 502 receives as inputs 504 and 506, one or more documents with tabular data, and a library of hypotheses, respectively. Application 502 includes functionality 508 to locate instances of tabular data in input 504. Using library of hypotheses 506 functionality 510 analyzes the functional dependencies of cell data in an instance of tabular data located by functionality 508 in input 504.

In performing the analysis, functionality 510 uses functionality 512 to determine cell-ranges participating in a given functional dependency. Some example ways of determining cell-ranges using clues and markups are described in this disclosure.

Functionality 514 assesses a confidence level in a functional dependency analyzed by functionality 510. Functionality 510, 512, and 514 operate on as many cells in as many table instances as needed in a given implementation without limitation. Application 502 outputs one or more NLP documents 516, with narrated table structures and functional dependencies identified therein, optionally including any suitable manner of indicating confidence levels in one or more such functional dependencies.

Figure 6:
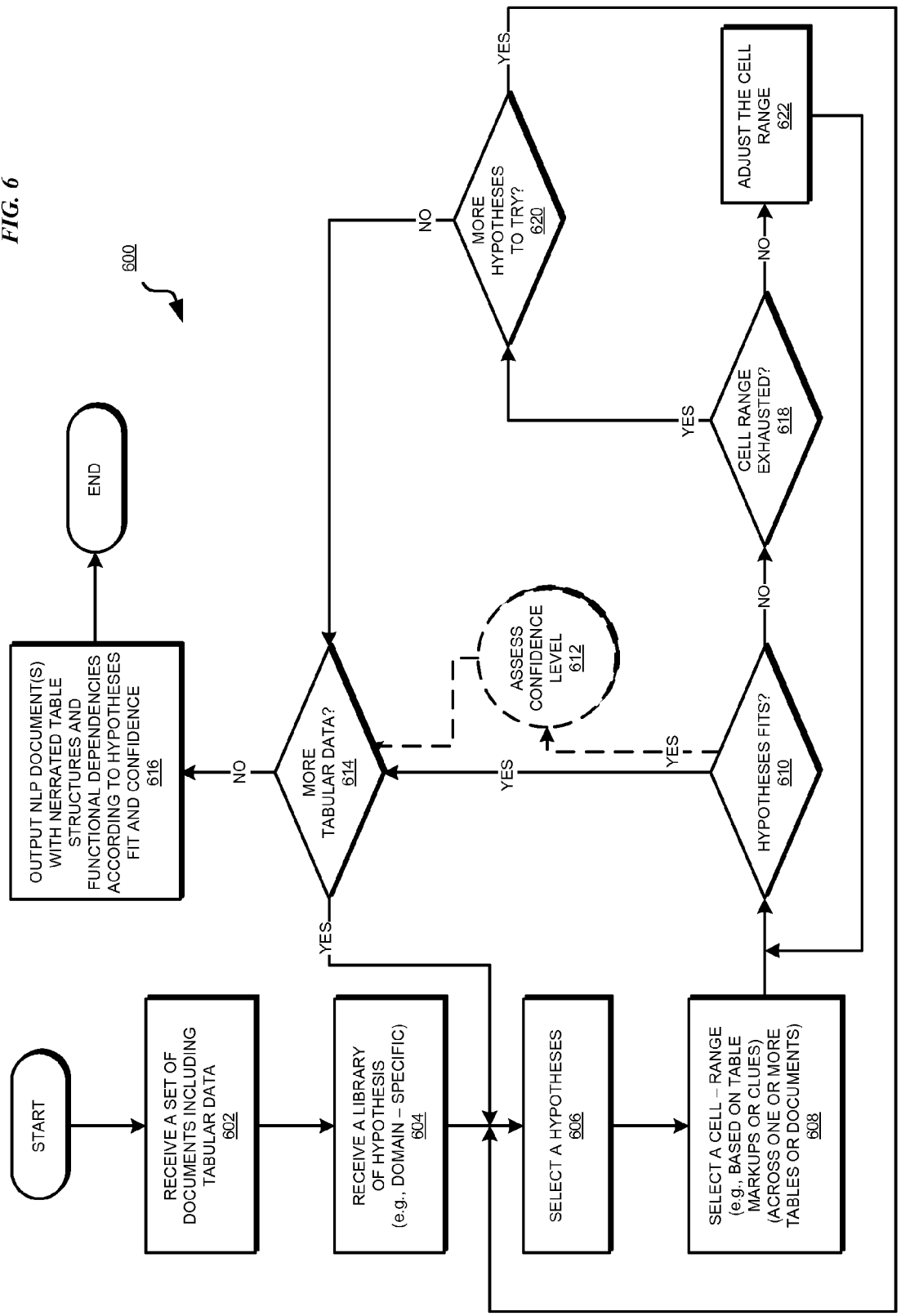
FIG. 6 depicts a flowchart of an example process for discovering relationships in tabular data in accordance with an illustrative embodiment.

With reference to FIG. 6, this figure depicts a flowchart of an example process for discovering relationships in tabular data in accordance with an illustrative embodiment. Process 600 can be implemented in application 502 in FIG. 5.

Process 600 begins by receiving a set of one or more documents that include tabular data (step 602). Process 600 receives a library of hypotheses (step 604). For example, the library of hypotheses can be limited to include only those hypotheses that are applicable to the subject-matter domain of the documents received in step 602.

The complexity of finding functional dependencies increases exponentially with the size of table being analyzed and the number of hypotheses in a given library of hypotheses. Thus, an embodiment optimizes the detection of functional dependencies by limiting the number or types of hypotheses in a given library of hypotheses, limiting the cell-ranges to search for functional dependencies, or a combination thereof.

Process 600 selects a hypothesis from the library of hypotheses (step 606). Process 600 selects a cell-range, such as by using clues, markups, or variations thereof, in some combination of one or more such clues, markups, or variations, across one or more tables or surrounding contents in one or more documents (step 608).

Process 600 determines whether the selected hypothesis fits the selected cell-range (step 610). For example, as described with respect to FIG. 4, process 600 may determine whether a cell in question computes as a column sum from a cell-range bound by certain markups above that cell. This example way of determining whether the selected hypothesis fits is not intended to be limiting on the illustrative embodiments. Because the hypothesis being used can be any suitable hypothesis according to the documents being analyzed, any suitable manner of determining whether the hypothesis is satisfied can be used within the scope of process 600.

If the selected hypothesis fits the selected cell-range ("Yes" path of step 610), process 600 proceeds to step 614. In one embodiment, after determining that a collection of clues support a hypothesis, process 600 assesses a confidence level in the functional dependency according to the hypothesis (block 612). An embodiment implements block 612 separately from process 600, and performs the confidence level assessment separately from process 600, such as in a different iteration, pass, or process. An embodiment of block 612 is described as process 700 in FIG. 7.

Process 600 determines whether more tabular data has to be analyzed to determine functional dependencies of cells (step 614). If more tabular data has to be analyzed ("Yes" path of step 614), process 600 returns to step 606. If no more tabular data is to be analyzed ("No" path of step 614), process 600 outputs one or more NLP documents, with narrated table structures and functional dependencies according to the hypotheses-fit and confidence (step 616). Process 600 ends thereafter. In one embodiment, process 600 outputs table structures and functional dependencies data according to the hypotheses-fit and confidence, for use in an existing NLP engine, such as NLP engine 103 in FIG. 1, which produces the NLP document.

At step 610, if process 600 determines that the selected hypothesis does not suitably fit the selected cell-range ("No" path go step 610), process 600 determines whether the cell-range has been exhausted for the selected hypothesis (step 618). For example, if the selected hypothesis is a "column sum" and the cell-range above the cell being evaluated has been reduced to zero cells, the cell-range would be exhausted for that hypothesis. Cell-range exhaustion is a hypothesis-dependent concept, and can be determined in any suitable manner according to the hypothesis being considered.

If the cell-range has been exhausted ("Yes" path of step 618), process 600 determines whether more hypotheses remain to be tried for the cell whose function dependency is being analyzed (step 620). If one or more hypotheses can be tried ("Yes" path of step 620), process 600 returns to step 606. If no more hypotheses are to be tried ("No" path of step 620), process 600 proceeds to step 614.

If a cell-range has not been exhausted ("No" path of step 618), process 600 adjusts the cell range, such as by increasing the number of cells in the range, decreasing the number of cells in the range, changing to a different range of cells, or a combination of these and other possible changes (step 622). Process 600 then returns to step 610.

Figure 7:
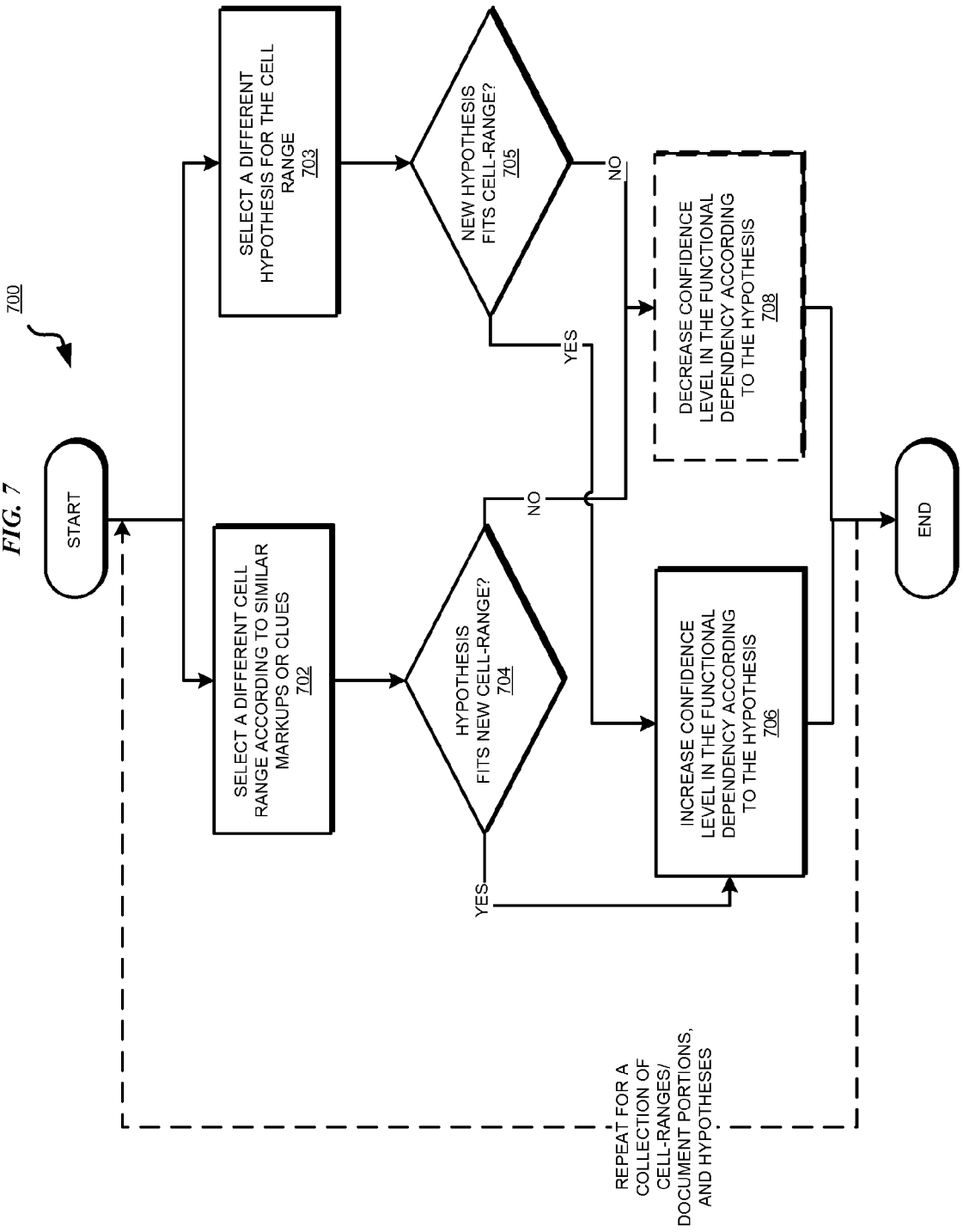
FIG. 7 depicts a flowchart of an example process for assessing a confidence level in accordance with an illustrative embodiment.

With reference to FIG. 7, this figure depicts a flowchart of an example process for assessing a confidence level in accordance with an illustrative embodiment. Process 700 can be implemented as block 612 in FIG. 6.

One branch of process 700 begins by selecting a different cell-range according to similar markups or clues (step 702). For example, in one embodiment, process 700 selects comparable cell-ranges in different columns or rows having similarly purposed data. In another embodiment, process 700 considers (not shown) other semantic clues, structural clues, denominations and type compatibilities among cells, suggestive words or phrases such as "total" or "sub-total", or a combination of these and other aids to select a different cell-range to verify a fit for the selected hypothesis.

In other words, for a cell-range and a hypothesis that is true for that range an embodiment searches for a set of supporting clues (features). That set of supporting clues may include not only markups or semantic clues, but also other hypotheses that were found true on that cell-range. The embodiment thus finds a collection of supporting evidence for that hypothesis on that cell-range. The embodiment then computes a total confidence score based on the collection of supporting evidence.

Process 700 determines whether the hypothesis (a primary hypothesis) fits the new cell-range selected in step 702 (step 704). If the hypothesis fits the new cell-range ("Yes" Path of step 704), process 700 increases the confidence level in the functional dependency according to the hypothesis (step 706). Process 700 ends thereafter. If the hypothesis does not fit the new cell-range ("No" path of step 704), process 700 may end or repeat thereafter, leaving the confidence level unchanged, or may decrease the level of confidence (step 708). For example, the value of a feature can be positive, zero or negative. For example, if there is no common header across three example columns, the value of the corresponding feature might be zero—that is, neutral. However, if the three columns have different semantic types, that feature will likely be negative thereby actually decreasing the confidence.

Another branch of process 700 begins by selecting a different hypothesis (a secondary hypothesis) fits the cell-range where another hypothesis (the primary hypothesis already fits), (step 703). Process 700 determines whether the other hypothesis—the secondary hypothesis—fits the cell-range (step 705). If the secondary hypothesis fits the cell-range ("Yes" Path of step 705), process 700 increases the confidence level in the functional dependency according to the hypothesis at step 706. Process 700 may end thereafter. If the secondary hypothesis does not fit the cell-range ("No" path of step 705), process 700 may end or repeat thereafter, leaving the confidence level unchanged, or may decrease the level of confidence at step 708.

When process 700 repeats, process 700 repeats for different cell-ranges and different secondary hypotheses in a similar manner. A repeat iteration evaluates different hypotheses across different ranges and found results. A secondary hypotheses may not apply to a cell-range initially, but, as more dependencies are discovered, the secondary hypotheses (and other higher-order hypotheses) (not shown) may start matching other cell-ranges and supporting other found results. Such matches or support may in-turn trigger testing other hypotheses, and so on (not shown).

During the confidence assessment phase an embodiment attempts to create a collection of various "features" that might increase the confidence level in a functional dependency. An embodiment regards the presence of second-order dependencies, as indicated by a secondary hypothesis fit (misfit), as yet another confidence-increasing (decreasing) feature. Applicability across cell-ranges is depicted in described in the several embodiments only as examples, without implying a limitation thereto. A feature set considered for confidence-level change is not limited only to range-similarity, but may be derived from many other characteristics of tabular data usable as clues, such as including but not limited to various markup clues, layout clues (i.e. common category header), semantic clues (i.e. all headers have the same semantic type (i.e. 'Year'), and derived discovered dependencies like similar dependency in multiple rows.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for discovering relationships in tabular data. An embodiment uses a library of hypotheses to test whether portions of a given tabular data have a particular structure and functional dependency. A hypothesis is tested for one or more cell-ranges to determine whether an outcome of the hypothesis is supported by computations using the selected cell-ranges. A confidence level is associated with the functional dependency within the cell-range according to the hypothesis. The cell-ranges are selected based on a plurality of criteria including variety of clues and markups in the tabular data, content surrounding the tabular data or elsewhere in the given set of documents.

Clues and hypothesis confirmations are described using cell-ranges in some embodiments only as examples and not to imply a limitation thereto. Information, clues, or features, to support selecting a particular hypothesis can come from any portion of a given document, including content other than tabular data in the document, within the scope of the illustrative embodiments.

Some embodiments are described with respect to predetermined hypotheses or known functions only as examples and not to imply a limitation on the illustrative embodiments. An embodiment can also hypothesize a previously unknown or un-programmed functional dependency, in the form of a learned function. For example, an embodiment may apply some analytical technique on data in a given table and find a statistical data pattern in the tabular data. The embodiment can be configured to account for such findings in the form of a learned function or learned hypothesis within the scope of the illustrative embodiments. The embodiment can then include the learned hypothesis into the collection for further validation or confidence level assessment.

The description of the examples and embodiments described herein are described with respect to clues, hypotheses, documents, tabular data, and NLP in English language is not intended to be limiting on the illustrative embodiments. An embodiment can be implemented in a similar manner using clues, hypotheses, documents, tabular data, and NLP in any language within the scope of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for determining relationships in tabular data, the method comprising:
   receiving a set of documents, a document in the set including the tabular data;
   applying, to the tabular data, a library of hypotheses specific to a subject-matter domain of the tabular data, each hypothesis in the library representing a hypothetical relationship between hypothetical cells of a hypothetical table,
      a first hypothesis in the library of hypotheses applying to hypothetical cells in a column of the hypothetical table,
      a second hypothesis applying to hypothetical cells in a row of the hypothetical table,
      a third hypothesis repeating in different columns of hypothetical cells of the hypothetical table,
      a fourth hypothesis repeating in different rows of hypothetical cells of the hypothetical table,
      wherein the hypotheses in the library are configured such that an applicability of a particular hypothesis to actual cells of the tabular data boosts an applicability of another particular hypothesis to the tabular data;
   identifying a markup in the document, the markup relating to a cell in the tabular data;
   identifying, using the markup, a selected cell-range in the tabular data;
   selecting the cell to determine a dependency of the cell on the cell-range;
   selecting, based on the markup, a hypothesis from the library of hypotheses to use in conjunction with the cell and the cell-range;
   applying the hypothesis to the cell-range;
   evaluating, based on a confidence value, that the hypothesis does not fit the cell-range;
   changing, responsive to the evaluating, the cell-range to form an adjusted cell-range;
   applying the hypothesis to the adjusted cell-range; and
   narrating according to the hypothesis, responsive to the hypothesis fitting the adjusted cell-range, using Natural Language Processing, a functional dependency between the cell and the adjusted cell-range.

2. The method of claim 1, wherein the applying the hypothesis to the cell-range is responsive to the confidence value exceeding a threshold.

3. The method of claim 2, further comprising:
   adjusting the confidence value responsive to the function specified in the hypothesis producing a second result that is supported by the markup related to a second cell.

4. The method of claim 3, further comprising:
   selecting, using the markup, a second portion, the second portion being a second cell-range, wherein the second selected cell-range is in a second tabular data included in the set of documents.

5. The method of claim 1, wherein the portion is a cell-range in the tabular data, further comprising:
   testing whether the hypothesis applies to the adjusted cell-range.

6. The method of claim 1, wherein the markup comprises a visual indentation in the selected portion.

7. The method of claim 1, wherein the hypothesis that is applied to the cell-range is selected based on a clue associated with the cell, wherein the clue is a semantic clue, the semantic clue being present in a header associated with the cell.

8. The method of claim 1, wherein the markup is a structural component of the tabular data, the structural component being a boundary marked in the tabular data.

* * * * *